(12) United States Patent
Stirniman

(10) Patent No.: US 6,804,010 B1
(45) Date of Patent: Oct. 12, 2004

(54) OPTICAL COATING THICKNESS OPTIMIZATION FOR FLY HEIGHT TEST MEDIA

(75) Inventor: Michael Joseph Stirniman, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 133 days.

(21) Appl. No.: 10/115,922

(22) Filed: Apr. 5, 2002

Related U.S. Application Data
(60) Provisional application No. 60/348,778, filed on Jan. 14, 2002.

(51) Int. Cl.[7] .................................................. G01B 9/02
(52) U.S. Cl. ...................................................... 356/507
(58) Field of Search ................................. 356/507, 505, 356/485, 492

(56) References Cited

U.S. PATENT DOCUMENTS

| | | |
|---|---|---|
| 3,855,625 A | 12/1974 | Garnier et al. |
| 4,593,368 A | 6/1986 | Fridge et al. |
| 4,624,564 A | 11/1986 | Dahlgren |
| 4,813,782 A | 3/1989 | Yagi et al. |
| 5,280,340 A | 1/1994 | Lacey |
| 5,410,402 A | 4/1995 | Li et al. |
| 5,473,431 A | 12/1995 | Hollars et al. |
| 5,502,565 A | 3/1996 | Fukuzawa et al. |
| 5,673,110 A | 9/1997 | Erickson et al. |
| 5,706,080 A | 1/1998 | Pekin et al. |
| 5,710,632 A | 1/1998 | Li |
| 5,715,060 A | 2/1998 | Sides |
| 5,751,427 A | 5/1998 | de Groot |
| 5,757,492 A | 5/1998 | Tokutomi et al. |
| 5,767,964 A | 6/1998 | Wahl et al. |
| 5,781,299 A | 7/1998 | Womack et al. |
| 5,808,736 A | 9/1998 | Womack et al. |
| 5,818,592 A | 10/1998 | Womack et al. |
| 5,932,887 A | 8/1999 | Guzik |
| 6,404,504 B2 * | 6/2002 | Liu et al. ..................... 356/507 |

* cited by examiner

Primary Examiner—Samuel A. Turner
(74) Attorney, Agent, or Firm—McDermott Will & Emery LLP

(57) ABSTRACT

A test media in the form of a disk for use in an apparatus for performing interferometric measurement/testing of fly heights of read-write head sliders, the disk having a central opening for use with a spindle for rotation about a central axis, comprising:

a disk-shaped substrate comprised of a light transmissive material and including a pair of opposed, smooth, major surfaces;

an optical underlayer in contact with one major surface; and a wear-resistant, protective overcoat layer on the optical underlayer for improving the tribological properties of the media;

wherein the thickness of the optical underlayer is selected for enhancing the sensitivity of testing by increasing the intensity of reflected light of pre-selected wavelength received by a detector for fly heights within a pre-selected fly height region-of-interest.

14 Claims, 3 Drawing Sheets

Position of minimum in reflected intensity vs $Si_3N_4$ thickness
$Si_3N_4$ n = 1.98, k=0.0

Intensity vs FH at 562 nm, normal incidence

OPTICAL COATING THICKNESS OPTIMIZATION FOR FLY HEIGHT TEST MEDIA

CROSS-REFERENCE TO PROVISIONAL APPLICATION

This application claims priority from U.S. provisional patent application Ser. No. 60/348,778 filed Jan. 14, 2002, the entire disclosure of which is incorporated herein by reference.

FIELD OF THE INVENTION

The present invention relates to method and apparatus for performing measurement/testing of the flying height of read-write head sliders utilized in disk-type data/information recording, storage, and retrieval systems. More particularly, the present invention relates to method and apparatus for performing flying height measurement/testing with increased sensitivity at very low flying heights on the order of $5\mu$ inches or less, e.g., $1\mu$ inch or less.

BACKGROUND OF THE INVENTION

Thin film magnetic and magneto-optical ("MO") recording media are conventionally employed in disk form for use with disk drives for storing large amounts of data in magnetizable form. Typically, one or more disks are rotated on a central axis in combination with data transducer heads. In operation, a typical contact start/stop ("CSS") method commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the bead and disk assembly is driven, the sliding surface of the head repeats the cyclic sequence consisting of stopping, sliding against the surface of the disk, floating in air, sliding against the surface of the disk, and stopping.

It is considered desirable during reading and recording operations, and for obtainment of high areal recording densities, to maintain the transducer head as close to the associated recording surface as is possible, i.e., to minimize the "flying height" of the head slider. Thus, a smooth recording surface is preferred, as well as a smooth opposing surface of the associated transducer head, thereby permitting the head and the disk surface to be positioned in close proximity, with an attendant increase in predictability and consistent behavior of the air bearing supporting the head during motion.

As should be evident from the above, an experimental method for verification and testing of the fly height of the head slider during both the design and production phases of read-write heads for rotating disk magnetic and MO storage media is necessary. At present, three (3) wavelength interferometry, as for example, disclosed in U.S. Pat. No. 5,280,340 to C. Lacey, the entire disclosure of which is incorporated herein by reference, is the most commonly employed technique for direct measurement of fly heights. Referring to FIG. 1, according to this technique, a test apparatus (e.g., such as manufactured by Phase Metrics, Inc., San Diego, Calif.) is utilized which comprises an optically flat, very smooth, light transparent rotating disk, e.g., of glass typically coated on a first surface or side (i.e., the lower disk side or surface in FIG. 1) with a very thin (e.g., 0.5–1.0 nm) layer of a perfluoropolyether lubricant, and a means for controllably positioning a head slider at a very small spacing (i.e., flying height or air gap) from the first side or surface of the disk. As shown in FIG. 1, white light emanating from a suitable source impinges the second side or surface (i.e., the upper disk side or surface in the figure) of the disk (illustratively at substantially normal incidence) and is transmitted through the disk. A first portion of the transmitted incident light travels through the air gap d between the first side or surface of the disk and the head slider, and reflected thereat back through the disk for ultimate receipt by a suitable detector positioned above the second side or surface of the disk; whereas a second portion of the transmitted incident light is reflected at the first side or surface of the disk back through the disk for ultimate receipt by the detector. The first and second portions of the transmitted light reflected from the head slider surface and from the first side or surface of the disk, respectively, are both constructively and destructively combined by interference in the space before the detector to yield a detector output which produces an intensity vs. wavelength pattern, depending upon the spacing (flying height) between the glass disk and the head slider (the preceding assumes that any portion of the incident light reflected from the second or front side surface of the glass disk is small and that any interference effect resulting therefrom is very small due to the thickness of the disk being much greater than the flying height d).

More specifically, and with reference to FIG. 2, the total reflected light intensity vs. wavelength resulting from the constructive and destructive interference of the first and second portions of the reflected incident light is modulated at a specific air gap or flying height d to produce a generally sinusoidally-shaped intensity vs. wavelength pattern having spaced-apart maxima and minima, and is compared with a calibration curve to determine the actual flying height. If incident light of a particular wavelength is utilized for the measurement, a half-cycle of the reflected intensity modulation corresponds to a change in the air gap or flying height d equal to one quarter (¼) of the particular incident wavelength. For example, for yellow/green incident light of 560 nm wavelength, the wavelength spacing between adjacent peaks of reflected light intensity of the intensity vs. wavelength pattern corresponds to a change in air gap or flying height of about 140 nm.

However, unlike typical interferometric measurements, the distances or spacings to be measured in air gap or flying height applications are much less than the wavelengths of the light utilized for the measurement, typically on the order of 25 nm (i.e., $1\mu$ inch) or less; consequently, only a small portion of the peak-to-peak reflected light intensity vs. wavelength modulation pattern can be utilized for flying height measurement. Therefore, in order to maximize the sensitivity of the measurement, it is advantageous for the air gaps or flying heights corresponding to the relatively slowly changing reflected light intensities at the maximum and minimum of the modulation pattern of the reflected light intensity to be far from the air gap or flying height region of interest, where the reflected light intensity is desired to change rapidly with change in air gap or flying height. Further, in order to maximize measurement sensitivity at spacings of 25 nm or less, it is considered essential that overall intensity losses arising from the disk substrate due to, inter alia, internal reflection and absorption within the glass disk and external reflection and scattering therefrom, be minimized.

As indicated above, the continuing requirement for decreased flying heights for obtaining increased areal recording densities of magnetic recording media has necessitated continuing improvements in the sensitivity and accuracy of flying height measurements at very low head-to-disk spacings. However, accurate determination of flying heights below about 25 nm utilizing lubricated optical glass disks, as described supra, have become ever more problematic. While the sources or origins of the difficulties are several and varied, they are, in essence, dominated by the fact that the glass material utilized for the disk is a poor tribological surface for interaction with head sliders which are typically provided at their sliding surface(s) with a wear-resistant coating, e.g., of diamond-like carbon ("DLC"). Moreover, in addition to physical damage imparted to the glass disk surface and the head slider due to their intermittent contacting as in the CSS operation described above, the head flying over the lubricant-coated glass disk surface often incurs undesirable lubricant/contaminant buildup, resulting in alteration of the air bearing characteristics and instability of the flying height.

While it is well known that addition of a lubricated hard carbon overcoat (e.g., of DLC) to a rotating disk surface can significantly improve the tribological performance thereof by affording protection against friction and wear induced by contact with the DLC-coated head slider, a difficulty arises in that the optical properties of sputtered carbon (utilized for the DLC overcoat) are such that at the minimum thickness (i.e., about 5 nm) necessary to improve the tribology of the head slider-disk interface, the total change in reflected light intensity at the detector during interferometric air gap or flying height measurement as described above, e.g., for green-yellow light of about 562 nm wavelength, over a fly height range of from near 0 to about 25 nm, is reduced to about one-fourth (¼) of the intensity change obtained with bare (i.e., uncoated) glass. The disadvantageous reduction in intensity change attendant upon the use of glass disks with lubricated DLC overcoats, hence measurement sensitivity reduction, is attributed both to increased internal reflection within the glass disk at the disk/DLC interface due to the poor refractive index (n) match of the two materials, and to an increased amount of light absorption and scattering within the DLC layer.

In addition to the reduction in measurement sensitivity attributable to the above-described optical effects such as absorption and scattering, an additional reduction in measurement sensitivity results from the fact that the composite optical properties of carbon-coated glass substrates are such that the position of the minimum in the intensity vs. fly height curve is shifted into the fly height region of interest. This phase shift is a general property of multi-layer stacks, and must be taken into consideration as a factor affecting measurement sensitivity, hence precision and accuracy.

Co-pending U.S. patent application Ser. No. 09/884,929 filed Jun. 21, 2001 (now U.S. Pat. No. 6,665,077 B1. issued Dec. 16, 2003) and commonly assigned with the present application, discloses an improved fly height test disk (i.e., media) for use in the above-described interferometric fly height measurement methodology and apparatus, comprising a disk-shaped glass substrate with a composite layer stack formed thereon, including an optical underlayer of quarter-wave optical thickness on the surface of the glass substrate, e.g., a silicon nitride (SiN) layer, a protective overcoat layer of a high refractive index material, e.g., a diamond-like carbon (DLC) material, on the silicon nitride layer, and a lubricant topcoat layer, e.g., a fluoropolymer such as perfluoropolyethylene (PFPE), on the protective overcoat layer. According to the principles set forth in the aforementioned application, the quarter-wave thickness of the optical underlayer was selected so as to reduce internal reflections within the glass substrate and increase the intensity of the incident light reaching the head slider. However, it has been determined that the total peak-to-peak intensity of the reflected light intensity modulation curve is not the only factor affecting the sensitivity of interferometric fly height measurements. More specifically, because the optical constants of the carbon (C)-based protective overcoat layers on the test disk media and the flying head are complex, the reflected intensity vs. fly height curve incurs a phase shift. As a consequence, the position of the minimum in the reflected light intensity may not correspond to zero fly height, and can be shifted to either positive or (theoretical) negative fly heights. If the optical properties of the composite layer stack of the test media are such that the position of the minimum is shifted into the fly height region-of-interest, e.g., between 0 and 25 nm (corresponding to about $1\mu$ inch), the sensitivity of the fly height measurement will then be reduced to near zero due to the flatness of the reflected intensity vs. fly height curve near the minimum.

On the other hand, if the position of the minimum of the sinusoidally-shaped reflected intensity vs. fly height curve were shifted such that the fly height region-of-interest fell nearer the steepest inclined portion thereof, a significant improvement in the sensitivity of the measurement could be obtained. In this regard, however, the position of the minimum of the sinusoidally-shaped reflected intensity vs. fly height curve is a complicated function of the thicknesses and optical properties of the coating layers on the flying head and the test media.

Accordingly, there exists a need for an improved method, apparatus, and disk means for performing interferometric measurement/testing of the fly height of a read-write head slider over the surface of a light transparent, rotating disk (e.g., of glass) having a layer stack comprised of an optical underlayer and a high refractive index, wear-resistant, protective overcoat layer thereon for improving the tribological properties thereof, which method, apparatus, and disk means overcome the drawbacks and disadvantages associated with the prior art means and methodology and affords increased measurement sensitivity at very low flying heights below about $5\mu$ inches, while providing full compatibility with all aspects of interferometric air gap or flying height measurement/testing.

The present invention addresses and solves problems attendant upon the use of interferometric techniques for the measurement/testing of very small air gaps or flying heights of read-write head sliders utilized in very high areal recording density rotating disk-based, magnetic data/information recording, storage, and retrieval media and systems, while preserving the essential features of conventional interferometric air gap measurement apparatus and technology. An advantage afforded by the present invention is the ability to fabricate and utilize test media (i.e., disks) required for fly height measurement which comprise coated glass substrates akin to those utilized for magnetic disks, which coated glass substrates may be prepared by means of techniques and instrumentalities conventionally employed in the manufacture of magnetic recording media. Moreover, the means and methodology of the present invention can be utilized for gap or spacing measurement/testing as may be required for all manner of devices, for example, devices utilizing probe scanning techniques, e.g., Atomic Force Microscopes ("AFM").

DISCLOSURE OF THE INVENTION

An advantage of the present invention is an improved method for method for performing interferometric measurement/testing of flying heights of read-write head sliders utilized in e.g., magnetic data/information recording, storage, and retrieval.

Another advantage of the present invention is an improved rotatable test media for use in performing interferometric measurement/testing of flying heights of read-write head sliders.

Still another advantage of the present invention is an improved apparatus for performing measurement/testing of flying heights of read-write bead sliders of data/information recording, storage, and retrieval systems.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are obtained in part by a method for performing interferometric measurement/testing of the fly height of a read-write head slider flying over a surface of a rotating test media, the test media comprising a light transmissive disk including a layer stack comprised of an optical underlayer in contact with the surface of the disk and a wear-resistant, protective overcoat layer on the optical underlayer for improving the tribological properties of the test media, the method comprising steps of:

(a) transmitting at least a portion of an incident light beam of pre-selected wavelength through the rotating disk for reflection by an air bearing surface of the read-write head slider facing the disk surface through an air gap; and (b) utilizing a test media wherein the thickness of the optical underlayer is selected for enhancing the sensitivity of the interferometric measurement/testing by increasing the intensity of reflected light of the pre-selected wavelength received by a detector for fly heights within a pre-selected fly height region-of-interest.

According to embodiments of the present invention, the pre-selected fly height region-of-interest is $5\mu$ inches or less, e.g., $1\mu$ inch or less; and the interferometric measurement/testing of the fly height of the read-write head slider over the surface of the rotating test media produces a sinusoidally-shaped reflected intensity vs. fly height curve wherein the fly height region-of-interest is shifted to be within the steepest inclined portion thereof.

In accordance with certain embodiments of the present invention, the light transmissive disk has a low refractive index from about 1.4 to about 1.6, the optical underlayer comprises a material having a very high index of refraction from about 1.9 to about 2.6 and a very low extinction coefficient k from about 0 to about 0.5, and the protective overcoat layer comprises a material having a high index of refraction from about 1.8 to about 2.4, e.g., the optical underlayer comprises a material selected from the group consisting of ZnS, $Si_3N_4$, $TiO_2$, $ZrO_2$, $Ta_2O_5$, $HfO_2$, TiN, BN, and multi-layer metal structures, and the protective overcoat layer comprises a diamond-like carbon (DLC) material.

According to particular embodiments of the present invention, the optical underlayer comprises $Si_3N_4$ or ZnS, e.g., the optical underlayer comprises an about 110–115 nm thick layer of $Si_3N_4$, the pre-selected fly height region-of-interest is $1\mu$ inch or less, and the incident light beam has a wavelength of about 560 nm.

Further embodiments according to the present invention include a layer stack additionally comprises a lubricant topcoat layer over the protective overcoat layer.

Another aspect of the present invention is a test media in the form of a disk for use in an apparatus for performing interferometric measurement/testing of fly heights of read-write head sliders, the disk having a central opening for use with a spindle for rotation about a central axis, the disk comprising:

a disk-shaped substrate comprised of a light transmissive material and including a pair of opposed, smooth, major surfaces;

an optical underlayer in contact with one of the major surfaces; and a wear-resistant, protective overcoat layer on the optical underlayer for improving the tribological properties of the test media;

wherein the thickness of the optical underlayer is selected for enhancing the sensitivity of the interferometric measurement/testing by increasing the intensity of reflected light of pre-selected wavelength received by a detector of the apparatus for fly heights within a pre-selected fly height region-of-interest.

According to embodiments of the present invention, the light transmissive substrate comprises a glass material having a low refractive index from about 1.4 to about 1.6; the optical underlayer comprises a material having a very high index of refraction from about 1.9 to about 2.6 and a very low extinction coefficient from about 0 to about 0.5; and the protective overcoat layer comprises a material having a high refractive index from about 1.8 to about 2.4, e.g., the optical underlayer comprises a material selected from the group consisting of ZnS, $Si_3N_4$, $TiO_2$, $ZrO_2$, $Ta_2O_5$, $HfO_2$, TiN, BN, and multi-layer metal structures; and the protective overcoat layer comprises a diamond-like carbon (DLC) material.

According to particular embodiments of the present invention, the optical underlayer comprises $Si_3N_4$ or ZnS, e.g., the optical underlayer comprises an about 110–115 nm thick layer of $Si_3N_4$, and the test media is utilized with incident light of about 560 nm for measurements in a pre-selected fly height region-of-interest within $1\mu$ inch or less.

Further embodiments of the present invention include test media with a lubricant topcoat layer over the protective overcoat layer.

Still another aspect of the present invention is an apparatus for performing interferometric measurement/testing of flying heights of read-write head sliders, comprising:

a rotatable test media comprised of a light transmissive substrate material; and means for optimizing the optical properties of one side of the test media for enhancing the sensitivity of said interferometric measurement/testing for flying heights within a pre-selected fly height region-of-interest with a pre-selected incident wavelength.

According to embodiments of the present invention, the pre-selected fly height region-of-interest is $5\mu$ inches or less, e.g., $1\mu$ inch or less, and the one side of said test media includes optical underlayer, protective overcoat, and lubricant topcoat layers thereon; and according to certain embodiments of the present invention, the test media is disk-shaped.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, wherein.

DESCRIPTION OF THE INVENTION

Figure 1:
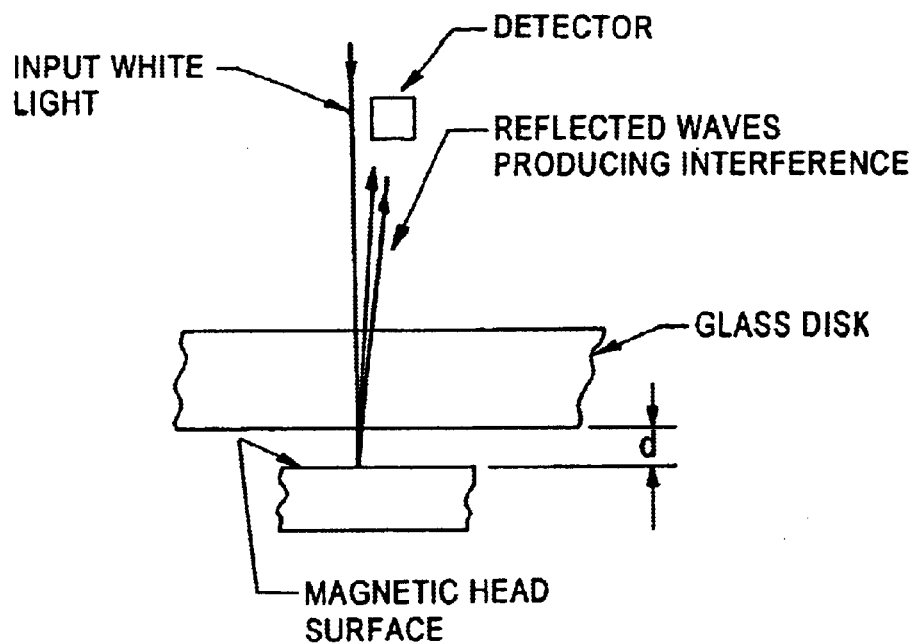
FIG. 1 schematically illustrates, in simplified cross-sectional form, the critical optical paths involved in the measurement of an air gap or flying height "d" by means of interferometry.
Figure 2:
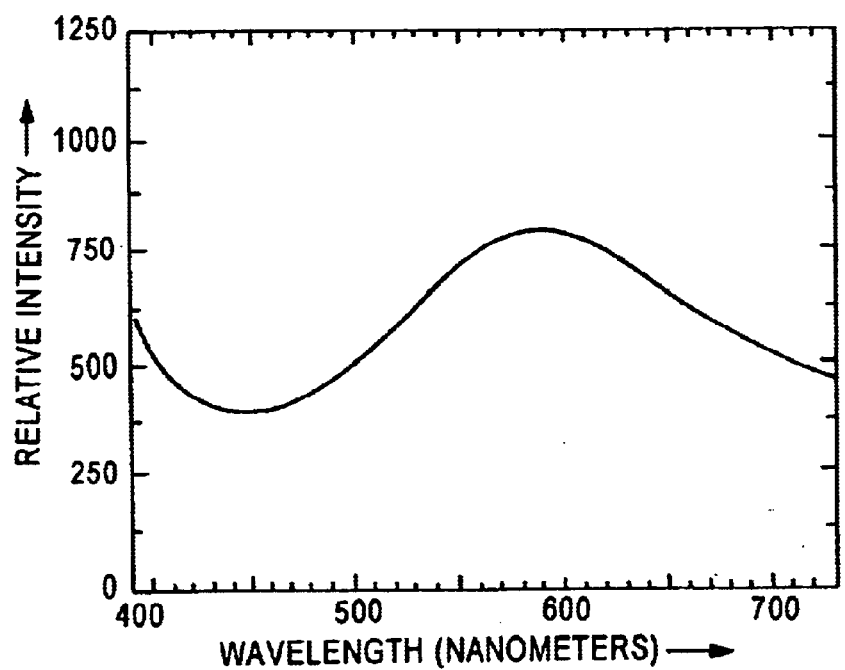
FIG. 2 is a sample of a graph of relative reflected white light intensity vs. wavelength obtained in an interferometric measurement of air gap or flying height utilizing an optical path arrangement as in FIG. 1.

The present invention is based upon the recognition that the sensitivity of interferometric measurement/testing of the air gap thickness or fly height of a read-write head slider of a magnetic or magneto-optical data/information storage and retrieval system operating at very low spacings from a rotating disk surface, e.g., from about 0 to about $5\mu$ inches, can be significantly enhanced by optimizing the thickness of an optical underlayer on the surface of a light transmissive, rotating test disk media facing the surface of the head slider across the air gap.

More specifically, the present invention is based upon recognition that the previously utilized quarter-wave thickness of the optical underlayer of the test disk media (selected so as to reduce internal reflections within the glass disk substrate and increase the intensity of the incident light reaching the head slider), incurs a drawback in that the total peak-to-peak intensity of the reflected light intensity modulation curve is not the only factor affecting the sensitivity of interferometric fly height measurements. That is, because the optical constants of the carbon (C)-based protective overcoat layers on the glass test disk media and the flying head slider are complex, the reflected intensity vs. fly height curve is shifted, such that the position of the minimum in the reflected light intensity may not correspond to zero fly height, and can be shifted to either positive or (theoretical) negative fly heights. Thus, if the optical properties of the composite layer stack of the test media (i.e., glass substrate/ optical underlayer/protective overcoat layer) are such that the position of the minimum is shifted into the fly height region-of-interest, e.g., between 0 and about 25 nm (corresponding to from 0 to about $1\mu$ inch), the sensitivity of the fly height measurement will then be reduced to near zero due to the flatness of the reflected intensity vs. fly height curve near the minimum.

A key feature of the present invention, therefore, is optimization of the optical underlayer thickness, i.e., departure from the previous practice of utilizing quarter-wave thicknesses, wherein the position of the minimum of the sinusoidally-shaped reflected intensity vs. fly height curve is shifted such that the fly height region-of-interest (e.g., 0 to about $5\mu$ inches, typically 0 to about $1\mu$ inch) falls nearer to the steepest inclined portion thereof. As a consequence of the inventive methodology, a significant improvement in measurement sensitivity is obtained vis-à-vis the prior methodology, while at the same time preserving the essential features of conventional interferometric air gap or fly height measurement apparatus and technology. Moreover, an advantage afforded by the present invention is the ability to fabricate and utilize test media (i.e., disks) required for fly height measurement which comprise coated glass substrates akin to those utilized for magnetic disks, which coated glass substrates may be prepared by means of techniques and instrumentalities conventionally employed in the manufacture of magnetic recording media. In addition, the means and methodology of the present invention can be utilized for gap or spacing measurement/testing as may be required for all manner of devices, for example, devices utilizing probe scanning techniques, e.g., Atomic Force Microscopes ("AFM").

Figure 3:
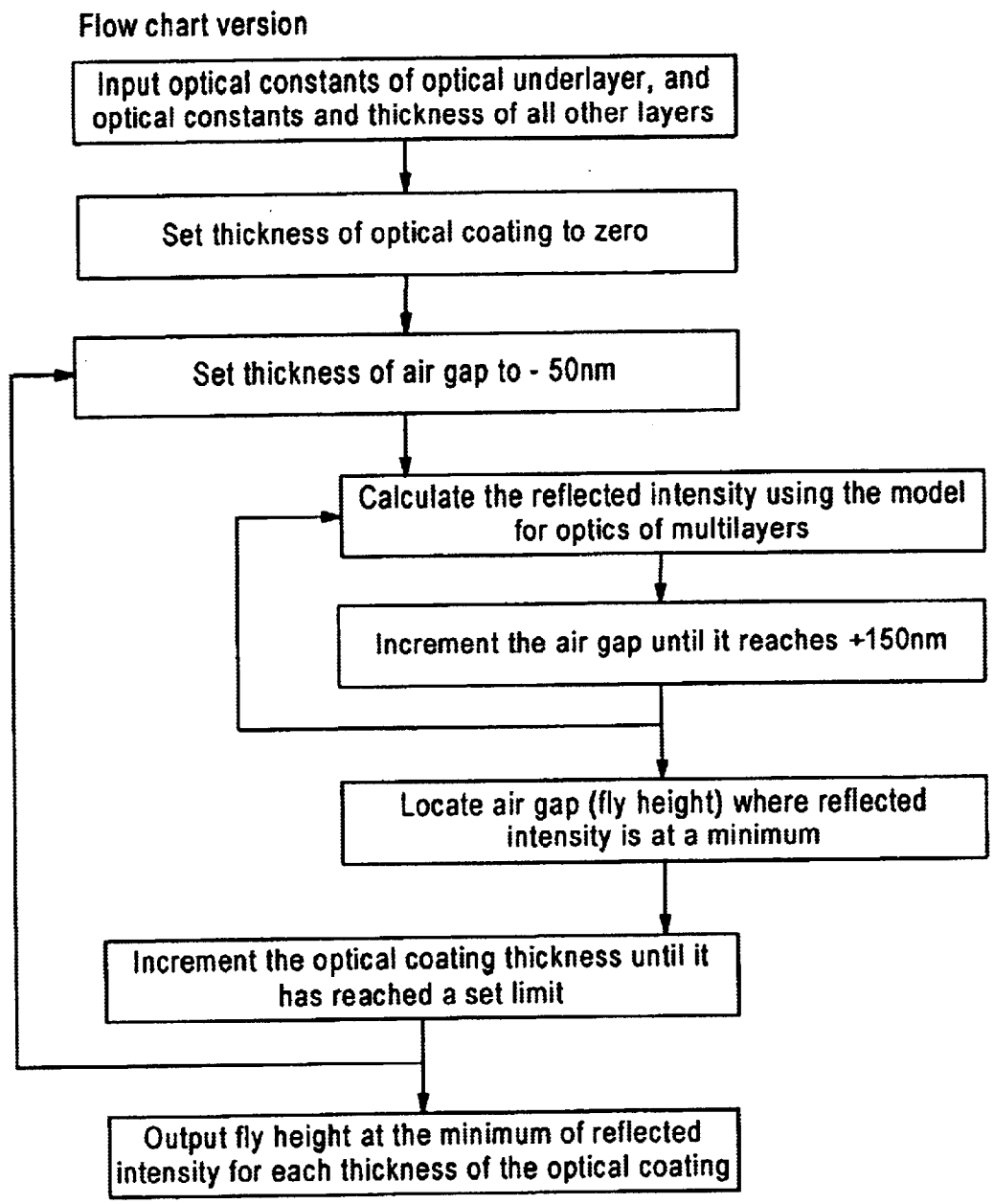
FIG. 3 is a flow chart for use in determining the pre-selected optical optical underlayer thickness of test media according to the invention.

According to the invention, the following stepwise procedure, summarized in flow chart format in FIG. 3, is utilized for determining the optimal thickness of the optical underlayer of the light transmissive test disk media, given its optical constants as well as the optical constants and thicknesses of the other layers of the test disk and the head.

1. the thickness of the optical underlayer, e.g., of $Si_3N_4$, is set at zero;

2. the thickness of the air gap (=fly height) is set at (theoretical) −50 nm;

3. the model for optics of multilayers of materials between two semi-infinite media (see below) is utilized for calculating the reflected intensity for a pre-selected wavelength λ of incident light (typically 562 nm, chosen because it is near the middle of the of the 3 wavelengths utilized in the measuring apparatus) as the air gap is incremented from (theoretical) −50 nm to +150 nm, for the optical underlayer thickness selected in step 1;

4. the minimum of the resultant reflected intensity vs. fly height curve is located, and the fly height at that minimum is assigned to the optical underlayer thickness selected in step 1;

5. the thickness of the optical underlayer is incremented to a new thickness;

6. a new reflected intensity vs. fly height curve is generated for the new (incremented) optical underlayer thickness; and 7. the above procedure is repeated for a sufficient number of incremented optical underlayer thicknesses to generate a plot or curve of the fly heights at the minima vs. the optical underlayer thickness.

Model for Optics of Multi-layers of Materials Between 2 Semi-infinite Media

The complex optical properties of the ith layer, $N_i$, are $$N_i = n_i - jk_i,$$

where n is the refractive index, k is the extenction coefficient, and $j = \sqrt{-1}$.

The complex phase shift for light of incident wavelength $\lambda$ at the ith layer of thickness $t_i$ is given by:

$$\delta_i = 2\pi N_i t_i / \lambda.$$

In the case of a test disk media for fly height measurement, we have a bottom semi-infinite medium, i.e., the glass disk, with a multi-layer stack on one surface thereof, consisting of an optical underlayer, a carbon (C)-based protective overcoat, and a lubricant topcoat. In addition, there is an air gap, determined by the fly height, a multi-layer head stack consisting of a head coating (typically of a diamond-like carbon material, DLC) and a head underlayer (typically of silicon, Si), and a top semi-infinite medium (i.e., the head substrate material).

The effective optical properties $N_{eff}$ of the entire stack comprised of, in sequence, the bottom semi-infinite medium (i.e., the disk substrate), the disk multi-layer stack, the air gap, the head multi-layer stack, and the top semi-infinite medium (i.e., the head substrate) are given by:

$$N_{eff} = \beta/\alpha,$$

where $\beta$ and $\alpha$ are the elements of the matrix B:

$$B = \begin{bmatrix} \alpha \\ \beta \end{bmatrix} = M_1 M_2 \ldots M_i A,$$

where:

$$A = \begin{bmatrix} 1 \\ N_{substrate} \end{bmatrix}$$

and $$M_i = \begin{bmatrix} \cos\delta_i & j(1/N_i)\sin\delta_i \\ jN_i\sin\delta_i & \cos\delta_i \end{bmatrix}.$$

The real intensity reflectance is then given by:

$$R = \rho \cdot \rho = |\rho^2|,$$

where the complex amplitude reflectance p is given by:

$$\rho = n_{glass} - n_{eff}/n_{glass} + n_{eff}.$$

EXAMPLE

As an example of the above-described methodology for determining the optimum thickness of an optical underlayer for glass substrate/optical underlayer/carbon (C)-based protective overcoat/lubricant topcoat layer test media for use in interferometric measurement of fly heights in the range of 0 to about $5\mu$ inches, particularly in the range of 0 to about $1\mu$ inch, the inventive procedure predicts that the optimum thickness of a silicon nitride ($Si_3N_4$) optical underlayer with a refractive index of 1.98 is about 110–115 nm. By contrast, according to prior practice, the quarter-wave thickness of this film for interferometric measurement of fly heights within this range would be about 71 nm.

Figure 4:
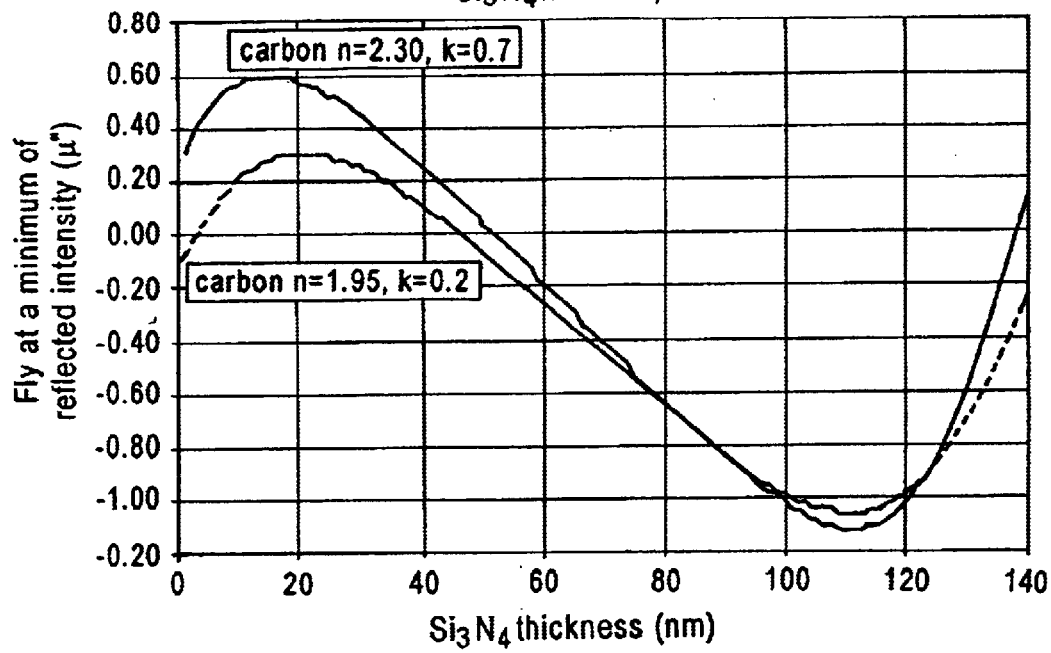
FIG. 4 is a graph showing the calculated variation of the position of the minimum in the reflected light intensity vs. fly height curve for 562 nm incident light, as a function of $Si_3N_4$ optical underlayer thickness.

Referring now to the graph of FIG. 4 showing the thus-calculated variation of the position of the minimum in the reflected light intensity vs. fly height curve for 562 nm incident light, as a function of $Si_3N_4$ optical underlayer thickness, it is seen that the position of the minimum of the reflected light intensity vs. fly height curve can be shifted from about (theoretical) –0.50 $\lambda$ inch to about (theoretical) –1.1$\mu$ inches by increasing the thickness of the $Si_3N_4$ optical underlayer from about 71 to about 110–115 nm. In addition, FIG. 4 indicates that the position of the minimum is not only at the most negative phase shift at ~115 nm $Si_3N_4$ thickness, but that the curve of FIG. 4 is also relatively flat in this region. As a consequence, the measurement is relatively insensitive to variation of the thickness of the $Si_3N_4$ optical underlayer within this thickness range, and any errors in fly height measurement arising from thickness variations during the optical underlayer film deposition process will be advantageously reduced. Stated differently, variations in thickness of the optical underlayer inherent in any deposition process will have a smaller effect on the phase shift curves of FIG. 5, as explained below.

Figure 5:
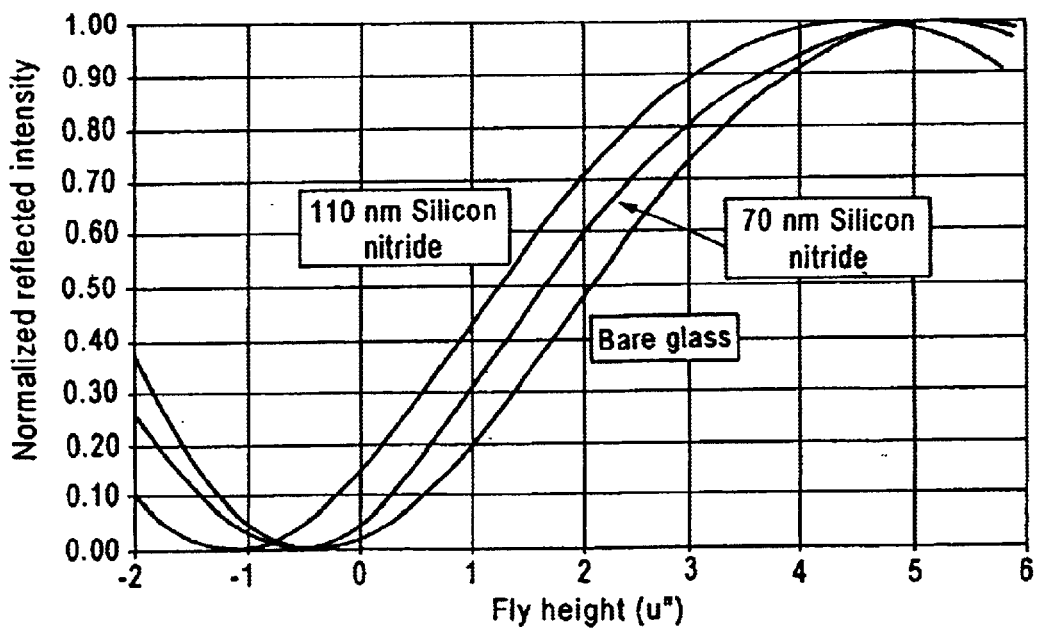
FIG. 5 is a graph showing the calculated reflected light intensity vs. fly height curves for the optimized 110 nm $Si_3N_4$ optical underlayer thickness, the 70 nm quarter wave optical thickness $Si_3N_4$, and a bare glass substrate, for normally incident 562 nm incident light.

More specifically, FIG. 5 shows graphs for comparing the calculated reflected light intensity vs. fly height curves for the optimized 110 nm $Si_3N_4$ optical underlayer thickness, the 70 nm quarter wave optical thickness $Si_3N_4$, and a bare glass substrate, for normally incident 562 nm incident light. If the reflected light intensity vs. fly height curves are shifted by thickness variations across the disk, or from disk-to-disk, errors in the measured fly height are introduced (because only a single calibration curve is utilized). However, according to the invention, use of an optimized thickness optical underlayer reduces any errors associated with thickness variations related to the deposition conditions, for the reasons given above.

In addition, it is evident from FIG. 5 that test disk media with the optimized 110 nm thick $Si_3N_4$ optical underlayers provide enhanced normalized reflected light intensity (of 562 nm light) vis-à-vis that provided by the conventional 70 nm thick $Si_3N_4$ optical underlayers, and even greater enhancement of the normalized reflected light intensity (of 562 nm light) vis-à-vis that provided by bare glass test disk media, thus demonstrating the efficacy of the present invention.

Thus, the present invention advantageously provides improved disk media for use in interferometric measurement of very low flying heights of read-write heads such as are utilized in very high areal recording density magnetic media and systems, i.e., below about $5\mu$ inches, preferably below about $1\mu$ in. The inventive media and methodology provide a substantial increase in the reflected light intensity of the reflected light intensity vs. wavelength modulation curve, thereby increasing the sensitivity of fly height measurement at very low fly heights. The disk media of the present invention are especially useful when employed in conjunction with interferometric flying height apparatus utilizing the three (3) wavelength method and enjoy particular utility in the development of high recording density media for computer-related applications. In addition, the inventive test media can be readily fabricated by means of conventional methodologies, e.g., sputtering techniques.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A method for performing interferometric measurement/testing of the fly height of a read-write head slider flying over a surface of a rotating test media, said test media comprising a light transmissive disk including a layer stack comprised of an optical underlayer in contact with said surface of said disk and a wear-resistant, protective overcoat layer on said optical underlayer for improving the tribological properties of said test media, the method comprising steps of:

(a) transmitting at least a portion of an incident light beam of pre-selected wavelength through said rotating disk for reflection by an air bearing surface of said read-write head slider facing said disk surface through an air gap; and (b) utilizing a said test media wherein said optical underlayer comprises a material having a very high index of refraction from about 1.9 to about 2.6 and a very low extinction coefficient k from about 0 to about 0.5, selected from the group consisting of ZnS, $Si_3N_4$, $ZrO_2$, $Ta_2O_5$, $HfO_2$, TiN, BN, and multi-layer metal structures, and the thickness of said optical underlayer is selected for enhancing the sensitivity of said interferometric measurement/testing by increasing the intensity of reflected light of said pre-selected wavelength received by a detector for fly heights within a pre-selected fly height region-of-interest, wherein said interferometric measurement/testing of the fly height of said read-write head slider over said surface of said rotating test media produces a sinusoidally-shaped reflected intensity vs. fly height curve and said pre-selected fly height region-of-interest is shifted to be within the steepest inclined portion thereof.

2. The method according to claim 1, wherein said pre-selected fly height region-of-interest is $5\mu$ inches or less.

3. The method according to claim 2, wherein said pre-selected fly height region-of-interest is $1\mu$ inch or less.

4. The method according to claim 1, wherein said light transmissive disk has a low refractive index from about 1.4 to about 1.6, and said protective overcoat layer comprises a material having a high index of refraction from about 1.8 to about 2.4.

5. The method according to claim 4, wherein said protective overcoat layer comprises a diamond-like carbon (DLC) material.

6. The method according to claim 1, wherein said optical underlayer comprises $Si_3N_4$ or ZnS.

7. The method according to claim 1, wherein said optical underlayer comprises an about 110–115 nm thick layer of $Si_3N_4$, said pre-selected fly height region-of-interest is $1\mu$ inch or less, and said incident light beam has a wavelength of about 560 nm.

8. The method according to claim 1, wherein said layer stack further comprises a lubricant topcoat layer over said protective overcoat layer.

9. A test media in the form of a disk for use in an apparatus for performing interferometric measurement/testing of fly heights of read-write head sliders, said disk having a central opening for use with a spindle for rotation about a central axis, said disk comprising:

a disk-shaped substrate comprised of a light transmissive material and including a pair of opposed, smooth, major surfaces;

an optical underlayer in contact with one of said major surfaces; and a wear-resistant, protective overcoat layer on said optical underlayer for improving the tribological properties of said test media;

wherein said optical underlayer comprises a material having a very high index of refraction from about 1.9 to about 2.6 and a very low extinction coefficient k from about 0 to about 0.5, selected from the group consisting of ZnS, $Si_3N_4$, $ZrO_2$, $Ta_2O_5$, $HfO_2$, TiN, BN, and multi-layer metal structures, and the thickness of said optical underlayer is selected for enhancing the sensitivity of said interferometric measurement/testing by increasing the intensity of reflected light of pre-selected wavelength received by a detector of said apparatus for fly heights within a pre-selected fly height region-of-interest, wherein said interferometric measurement/testing of the fly height of said read-write head slider over said surface of said rotating test media produces a sinusoidally-shaped reflected intensity vs. fly height curve and said pre-selected fly height region-of-interest is shifted to be within the steepest inclined portion thereof.

10. The test media as in claim 9, wherein:
    said light transmissive substrate comprises a glass material having a low refractive index from about 1.4 to about 1.6; and
    said protective overcoat layer comprises a material having a high refractive index from about 1.8 to about 2.4.

11. The test media as in claim 10, wherein:
    said protective overcoat layer comprises a diamond-like carbon (DLC) material.

12. The test media as in claim 9, wherein:
    said optical underlayer comprises $Si_3N_4$ or ZnS.

13. The test media as in claim 9, wherein:
    said optical underlayer comprises an about 110–115 nm thick layer of $Si_3N_4$, and said test media is utilized with incident light of about 560 nm for measurements in a pre-selected fly height region-of-interest within $1\mu$ inch or less.

14. The test media as in claim 9, further comprising:
    a lubricant topcoat layer over said protective overcoat layer.

* * * * *